United States Patent
DeSimone

(12) 
(10) Patent No.: US 6,175,619 B1
(45) Date of Patent: Jan. 16, 2001

(54) ANONYMOUS VOICE COMMUNICATION USING ON-LINE CONTROLS

(75) Inventor: Antonio DeSimone, Ocean, NJ (US)

(73) Assignee: AT&T Corp., New York, NY (US)

( * ) Notice: Under 35 U.S.C. 154(b), the term of this patent shall be extended for 0 days.

(21) Appl. No.: 09/111,672

(22) Filed: Jul. 8, 1998

(51) Int. Cl.[7] .................................................. H04M 3/42
(52) U.S. Cl. ...................... 379/202; 379/93.21; 379/900; 348/15; 370/261
(58) Field of Search ..................... 379/202, 211, 379/93.21, 900; 348/15; 370/260, 261

(56) References Cited

U.S. PATENT DOCUMENTS

| | | | |
|---|---|---|---|
| 4,847,890 | * 7/1989 | Solomon et al. | 379/211 X |
| 4,878,239 | * 10/1989 | Solomon et al. | 379/211 X |
| 5,058,152 | * 10/1991 | Solomon et al. | 379/211 X |
| 5,361,295 | * 11/1994 | Solomon et al. | 379/213 X |
| 5,596,627 | * 1/1997 | Solomon et al. | 379/211 X |
| 5,604,792 | * 2/1997 | Solomon et al. | 379/211 X |
| 5,623,536 | * 4/1997 | Solomon et al. | 379/211 X |
| 5,768,348 | * 6/1998 | Solomon et al. | 379/211 X |
| 5,812,768 | * 9/1998 | Pageet et al. | 709/217 X |
| 5,880,731 | * 3/1999 | Liles et al. | 345/349 |

* cited by examiner

Primary Examiner—Creighton Smith

(57) ABSTRACT

A system and method for providing anonymous voice communications using the telephone network under the direction of an on-line data network. A call broker receives call setup information from on-line session participants, such as chat room participants, after providing callback telephone numbers and, as appropriate, billing information. In one illustrative embodiment, a user (the call initiator) present in a chat room session establishes a data connection to a telephone company site using, e.g., an Internet web browser to establish a Call Broker session. The Call Broker then provides session information (such as a telephone company URL) and a Participant Authorization Code (PAC), which information is passed to a selected chat participant in the current chat room. When the chosen participant uses the received URL to access the telephone company site, and enters the received participant code and a call-back number, the telephone company completes voice links to the initiator and the selected participant and bridges these links together. Other embodiments permit adding additional parties, and engaging the chat server to negotiates with the Call Broker to establish a PAC that is made available to all chat participants. These and other embodiments of the present invention permit participants in an on-line chat or similar text-based session to retain their anonymity while extending their communications to voice calls.

18 Claims, 1 Drawing Sheet

ANONYMOUS VOICE COMMUNICATION USING ON-LINE CONTROLS

FIELD OF THE INVENTION

This invention relates to a method and apparatus for providing telephone communications using on-line communication links to select and setup telephone connections while maintaining anonymity of calling and called parties.

BACKGROUND OF THE INVENTION

Current computer network communications permit users to communicate with one another anonymously over dialed-up or other access lines. For example, on-line service providers allow users to connect their personal computers (PCs) together for purposes of anonymously communicating with one another. On-line service users can elect to participate in on-line text discussions using channels or "virtual rooms" devoted to discussions on general or specific topics. In such virtual or "chat" rooms (or a number of similar constructs) text "chats" take place in which users send text to one another or just observe ("listen"). Once a chat session is in place, on-line service users may elect to enter or exit a session at will. Generally, a list of users taking part in a chat are listed or otherwise indicated on each session user's computer screen. User identities in these lists usually take the form of "nicknames" or "handles" to preserve user anonymity, a hallmark of chat and many other forms of on-line communications.

Chat rooms are devoted to myriad subject areas selected by a service or system operator, or by the participants themselves. Procedures are in place in many of these on-line venues to request the establishment of a particular subject chat room for a fixed time or indefinitely. More recently, features such as "sub-chats" or "private chats" have been provided in some on-line contexts by which a subset (self-selected or upon request by others) of the on line chatters are moved to a separate chat (virtual) venue.

Another feature available in some chat sessions is "Instant Messaging" or similar-named facility by which one user in a chat session is able to send direct messages to one or more other users taking part in the chat. Thus, if side comments not appropriate for general observation are desired between two users, selection (usually by a screen message button) of the instant messaging feature results in a window on the selecting user's computer screen along with prompts for the intended message recipient and the content of the message. When the message originator completes these fields and a Send (or similar) screen button is pressed (clicked on), the message is sent privately to the intended recipient using the hosting message functionalities. Typical uses of these instant messages include setting up private chat rooms and inviting others to join.

While the chat sessions described above are all text chat rooms, i.e., all communication is via text messages between the chat session users, provision has been made of late for Voice Chat rooms. In typical voice chat rooms a number of users participate in a manner similar to a discussion by way of a telephone conference call. Often, in a voice chat room, there is no single host user—so voice inputs are often made simultaneously by more than one user. The result is sometimes that voice input, or some of it, is lost. Overall, however, modest sized conferences can proceed without untoward confusion or congestion.

The mechanism by which such voice chat sessions operate is usually the same or very closely related to those used in text chats. Thus, a functional voice chat "layer" can be added over what is basically a text chat session control mechanism. This is desirable because the chat server requires minimum changes to effectuate the voice capabilities. Moreover, such voice chats proceed entirely within the chat server (or servers for distributed chat networks). No connection to the telephone network (other than a datalink via modem or the like if no other connection to a data network access point is available) is required. While such voice chat conversations typically prove satisfactory for many purposes, private voice chat room functionality has not emerged. Among the factors contributing to this condition are the not-always-satisfactory quality of data network voice transmission, network host capacity and complexity of changes at such network chat hosts.

One approach to introducing voice communications between chat session users or in other communications settings is described in a co-pending patent application entitled "Anonymous Voice Communications" by R. B. Leipow, Ser. No. 08/573865, filed Jul. 2, 1996 and assigned to the assignee of the present application. In that application, which is hereby incorporated by reference in the present application as if set forth in its entirety herein, a trusted agent is used to establish voice communications between on-line parties while maintaining anonymity of the parties. The trusted agent is illustratively implemented as an adjunct to processor functions at a network server, such as an on-line chat server.

While efforts to achieve anonymous telephone communications between users in contexts like on-line chat sessions have proven possible, such efforts have generally required significant modifications at an on-line server that are applicable only to voice chat participants. Thus, in such contexts telephone functionality not otherwise used at a chat server is required to effect the desired anonymous voice communications between chat users or others similarly situated in other communications contexts.

SUMMARY OF THE INVENTION

The present invention overcomes limitations of the prior art and achieves a technical advance in providing anonymous voice communications using the telephone network under the direction of a call broker.

In a first illustrative embodiment, a user (the call initiator) present in a chat room session establishes a data connection to a telephone company site using, e.g., an Internet web browser. After using the browser to provide appropriate billing qualification (e.g., using credit card information) and to provide a callback number, the initiator receives a call-control applet from the telephone company site, thus establishing a Call Broker session. As is known, credit card information is advantageously captured in the browser to allow transfer over the Internet in encrypted form without requiring additional security measures in the applet. In this first illustrative implementation, the session is to be billed to the initiator.

The information received from the Call Broker includes session information (such as the telephone company URL) and a Participant Authorization Code (PAC). Using an instant messaging or similar selection button on the screen image for the received applet, the initiator causes a telephone company URL and participant code to be passed to a selected chat participant in the current chat room. When the chosen participant uses the received URL to go to the telephone company site, and enters the received participant code and a call-back number, the telephone company completes voice links to the initiator and the selected participant, typically in that order. The telephone call is thereby completed between the initiator and selected chat session participant without sharing telephone numbers.

If the initiator wishes to add another participant in the chat room to the voice session, the button on the applet again provides the same URL and a new participant code to the second selected chat session participant. Each participant code is typically different and allows at most one participant to join the voice session. This prevents promulgation of valid participant codes by anyone other than the initiator. As an alternative, multiple participants can use the same code, but this option is less secure since the possibility exists for abuse, where a participant may propagate a valid code without the knowledge of the initiator.

In an alternative embodiment of the present invention there is no initiator in the sense of above described embodiment, but interaction with a call broker is accomplished on behalf of the would-be telephone call participants by the chat server(s). The chat server then negotiates with the Call Broker to establish a PAC that is made available to all chat participants. Thus, for example, when a subgroup (or all) in a text chat session agree to establish a telephone connection between them they convene in a separate chat room to which a PAC has been assigned for that purpose. The "separate" chat room can be achieved by simply redefining their current chat room if all participants are to take part in the telephone call. In any event, those in this separate chat room in effect have requested of their chat server(s) that it or they should contact the call broker to obtain participant authorization codes and session identification. In making these requests, the would-be participants provide necessary credit or other billing qualification on an in individual basis to the Call Broker, along with the call back number. When the telephone company is satisfied that the authorization and session information is in order, it bridges the individual participants onto a conference bridge. Of course, the "conference" may include only two participants.

These and other embodiments of the present invention permit participants in an on-line chat or similar text-based session to retain their anonymity while extending their communications to voice calls.

BRIEF DESCRIPTION OF THE DRAWING

The above summarized invention will be more fully understood from the following detailed description read in light of the attached drawing, wherein.

DETAILED DESCRIPTION

Figure 1:
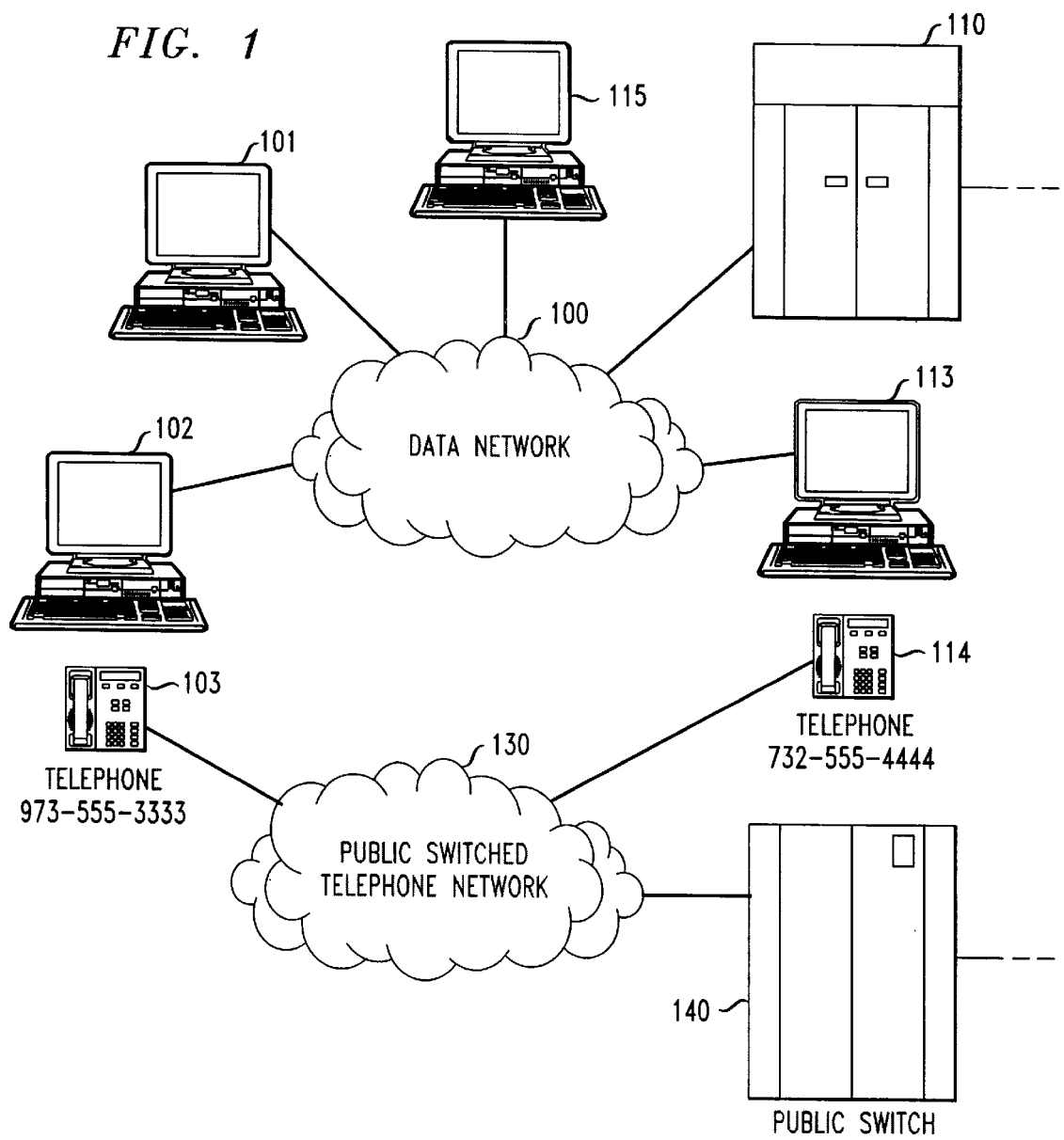
FIG. 1 is a block diagram of communications network comprising data and optional voice links.

FIG. 1 is a representation of a data network interconnecting a plurality of user locations, each having a personal computer (PC) or other terminal device. Data Network "cloud" 100 represents a network of data links and nodes such as or including the Internet accessed over links from user locations such as 101, 102, 113 and 115. Of course in a real world setting the number of user locations and terminals can be much larger. In the illustrative network of FIG. 1, an on-line server 110 serves at least some of the data networking needs of users at terminals such as 101, 102, 113 and 115. Servers such as 110 generally provide a large number of services to network users, illustratively including on-line chat services. The dashed lines to its right show server 110 to be one of a possibly large number of servers interconnected to provide a particular service or range of services.

Also shown in FIG. 1 is a Public Switched Telephone Network (PSTN) cloud 130 connected to a representative one (140) of many public switches. It will be understood that though PSTN cloud 130 is shown separately for discussion purposes, part of this network cloud represents connections from user locations to nodes in data network 100. Public switch 140 is representative of network switches operated by one or more network operators for providing a number of network services. These services include Plain Old Telephone Service (POTS), voice conferencing services and many other network services well known to the field. Two representative telephone sets 103 and 114 associated respectively with data network stations 102 and 113 are shown connected to the PSTN cloud 130. For discussion purposes these two telephone sets will be assumed to be co-located with the associated PCs or other terminals connected to the data network cloud 100.

In typical operation of the data network and data terminals (e.g., PCs) 101, 102, 113 and 115 may be participating in a text chat session through the chat facilities of on-line server 110 and/or one or more of the other servers cooperating to provide the chat service. For simplicity of presentation, it will be assumed that the entire chat session is controlled from server 110, but it should be understood that the chat (or similar text meeting functionality) can be provided by a number of widely distributed networked servers.

During the course of the chat session one of the typical chat participant at terminal 102 is desirous of establishing a voice conversation with the chat participant at terminal 113. In accordance with aspects of illustrative embodiments of the present invention communications in or deriving from the on-going chat session are employed to establish such a telephone conversation between mutually consenting chat participants. Two-party or more comprehensive telephone calls (e.g., conference calls) can also be established among willing chat participants, as will be seen in the following description.

Each of the potential telephone call participants is assumed to have an available telephone line. For the initial description a two-party telephone call will be assumed, with the parties having telephone numbers (973) 555-3333 (for the user at terminal 102) and (732) 555-4444 (for the user at terminal 113). It may also occur that one or both of these chat participant locations may have but a single telephone line, which line is in use for providing access to the terminal chat session. In such cases, provision is made to have the telephone call setup accomplished in such manner that the on-line chat participation (and other on-line communications) can be terminated or suspended, thereby freeing up the phone line for the desired telephone call.

Figure 2:
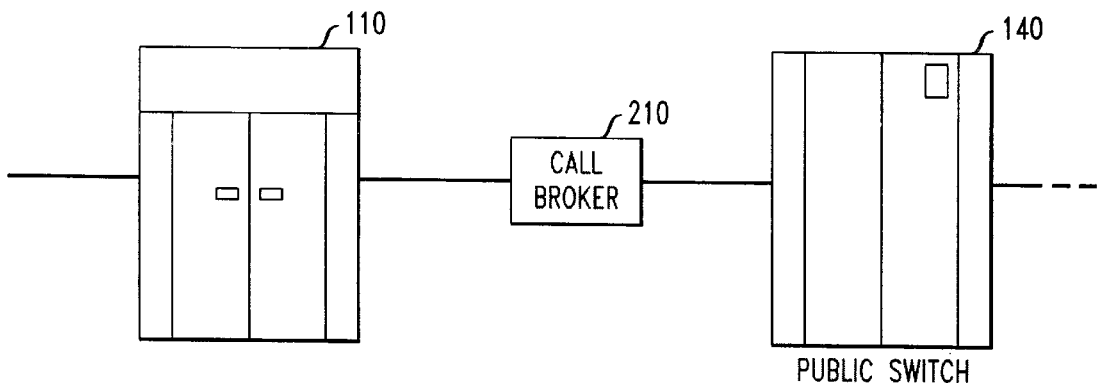
FIG. 2 illustrates the manner in which a Call Broker function is introduced between an on-line chat server and a telephone network switch.

In initiating the establishment of a telephone call between chat participants at locations 102 and 113, the party seeking to establish the call (the "initiator") uses standard Internet browser functionality to establish contact with a Call Broker. The Call Broker functionality can be associated with the on-line server, the public switch or another person or entity. For present illustrative purposes, the Call Broker is assumed to be associated with the telephone company, as represented by the public switch 140. In FIG. 2 Call Broker 210 is shown intermediate the on-line switch 110 and the public switch 140.

Call Broker 210 may illustratively be a separate programmed hardware element, such as a telephone network node arranged to receive data messages from data network 100 and forward telephone network signaling information to the PSTN using standard telephone signaling techniques, such as Signaling System 7 (SS7). Alternatively, Call Broker 210 may be an adjunct co-located with a PSTN switch, or it may be part of such a switch. Access to the Call Broker through the on-line browser session is accomplished in normal fashion, as by selecting a browser button (or favorite or bookmarked location) using browser or equivalent functionality at the user terminal. As shown in FIG. 2, the data network server(s) 110 hosting the chat server session is in communication with the Call Broker 210 using the facilities of the data network 100, whether the Call Broker is at a telephone company location or not. The availability of such communications avoids any requirement that the Call Broker and the chat server have a special relationship, such as being part of some integrated complex of servers.

Communication between the telephone call initiator (102 in FIG. 1) and the Call Broker 210 includes the presentation to the Call Broker 210 of billing identification, such as a telephone company calling card number, debit card number (or other pre-paid calling data) or credit card number or the like which is subject to validation by the Call Broker 210 in standard fashion. For example, such validation can be accomplished through the PSTN via public switch 140 to credit card validation databases. Alternatively, Call Broker 210 may employ the data network 100 or some other data network (not shown) to convey query and response messages between the Call Broker 210 and the credit card authorization database. When calling card billing identification is used messages can be sent through the PSTN to a telephone company network database for authorization, as is well known in the art.

Also sent to the Call Broker 210 in FIG. 2 by the telephone call initiator is a callback number, in this example, (973) 555-3333. The response to the request to initiate a telephone call, assuming the request for billing authorization is approved, is a call control applet sent from the Call Broker to the initiators location to further control the establishment of the telephone call. Further, the Call Broker 210 forwards to the initiator session information, typically in the form of the same URL as used by the initiator—though a separate identifier can be used. Also sent by the Call Broker to the initiator is a Participant Authorization Code (PAC). PACs advantageously are time limited, i.e., if not used in a predetermined time, they expire and are unusable, and may not be used by more than one telephone call participant.

When the session identification and PAC data are received by the initiator, they may be forwarded by the initiator to the selected called party, typically using instant messaging or a text discussion in a private chat room set up with the selected chat participant. With the session information and PAC available, the selected (called) chat session participant can become a party to the desired telephone call by contacting the Call Broker 210 using the session information, and providing the PAC and a callback number (in the example in FIG. 1, (732-555-4444)). When the Call Broker 210 is satisfied that the information provided by the selected called party is in order, the Call Broker 210 signals the telephone company (represented by switch 140) to call both the initiator's telephone number and the called party's telephone number. In the present example, the initiator will be responsible for payment of all telephone call charges.

While the preceding example embodiment of the present invention has been based on calling between an initiator and a called party, it will be understood that the same principles and techniques may be used for multi-party calling. Thus the initiator may seek PACs for a plurality of different potential called parties. To minimize the possibility of misuse, a different PAC will typically be used for each called party. PACs for a number of potential called parties may be sent in one message to the initiator, or separate requests for PACs may be used—as the Call Broker and/or telephone company may require.

In an alternative billing arrangement, the communications between the potential called party(ies) and the Call Broker may include a request by the Call Broker for billing information. In these cases, the potential called party will pay a portion (or all) of the call charges. Thus, the nature of the PACs requested and sent to the initiator can vary, and need not be all of the same kind: one PAC may carry with it an authorization for the initiator to be charged for a called party's portion of the charges, while a second (or other) PAC may require that the called party agree to pay for some or all of the charges.

In a further variation of the billing arrangements, a called party already participating in a telephone call setup as described above, may receive agreement from other participants in the telephone call to add one or more additional parties to the call. In such circumstances, that party may launch a further message to the Call Broker using an "add a party" button and again negotiating billing information. In these circumstances, the Call Broker may poll the initiator (and some or all other existing participants in the telephone call) to determine if there is any objection to the adding of additional parties. In such Call Broker queries, the party proposed to be added will typically be identified from among other text chat session (or other) on-line users, and the billing basis will typically be announced. Unanimity (or no objections heard, or some other criteria) among existing telephone conversation parties (or only those being billed) will be usually be required before the Call Broker 210 will permit any such call participant to be added.

In the foregoing illustrative embodiments, the participation of the on-line server in establishing telephone voice conversations is minimal. In fact the on-line server involvement has been primarily in standard message passing operations between the text chat participants and the Call Broker. Further, in the illustrative embodiments described thus far, the Call Broker functionality has been assumed to be within the telephone company realm. In some circumstances, however, it proves convenient to include certain Call Broker functionality in the on-line server(s) providing text chat functionality, or in some non-telephone company server.

In one illustrative embodiment of the present invention involving the on-line server(s) to a greater degree than the preceding example embodiments, no particular on-line text chat participant initiates telephone call participation. Rather, the chat server(s) establish a parallel voice chat room for some or all text chat sessions that are established. In one particular illustrative embodiment of this general type, a sub-chat or private chat venue (room) is set up at the request of participants of the text chat session.

When the on-line server 110 sets up a text chat room that permits the establishment of telephone connections between participants (a voice-enabled chat), it typically concurrently establishes a Call Broker session on the on-line server (or at another non-telephone company location). For simplicity of presentation, the Call Broker will be assumed to be associated with the on-line server. Thus, for example, in the representation of FIG. 2, the Call Broker functionality 210 is associated with processes running on the on-line server, which processes include messaging or SS7 (or other telephone) signaling functionality for communicating with a telephone switch or switches. Upon receipt of well-known signaling messages (or other agreed-upon messages) the telephone switches set up the calling links and bridges as required.

The voice session is advantageously initialized in an exchange of messages between the chat server session running on an on-line server and the Call Broker session on that or another server in a server network interconnected by data network 100. The transaction between the chat server and Call Broker identifies to the Call Broker those potential participants in a voice session (here, a telephone call) in preparation for further negotiation between the Call Broker and client sessions for each of the chat room participants.

In a typical embodiment, the text chat clients running on the chat participants' PCs or terminals allows a participant in a voice-enabled chat to then negotiate with the Call Broker running on the server(s). Communications between the respective text chat clients in a voice-enabled chat session and the Call Broker 210 then include the same billing approval operations and callback information as before, but advantageously also include data identifying (by nickname, etc.) existing telephone call participants. Individual participants may advantageously indicate willingness to pay for telephone call connections to other users, as by completing additional billing form screen elements (e.g., checking "will pay all telephone charges" or "will pay for (identified) chat participants") as well as the usual calling card, debit card or credit card information and the like. Other billing arrangements may, of course, be made for some class of users, or participants in some particular text chat sessions. In all cases, though, the use of the Call Broker allows anonymity of the participants to be maintained. In one particular case, billing for all participants in a telephone call can be made to a third party, including, in particular, the party providing the chat server. This latter party can, of course, arrange compensatory billing from the users through a subscription or other relationship.

In any event, as the Call Broker session running on the on-line server receives authorization to bill telephone calls to participants, it provides messages or telephone signaling information to a telephone company switch such as switch 140 to establish the required connections. The switch, as in the other examples, provides bridging between telephone links to the authorized telephone call participants. Such bridging will be accomplished locally at the switch 140 or elsewhere in the telephone network, as is well known in the art.

When an on-line text chat participant gains access to an on-line server using the only available telephone line (the line having the callback number provided to the Call Broker), the actual callback is advantageously delayed until the on-line session is paused or terminated, thereby freeing up the line associated with the callback number.

What is claimed is:

1. A call broker comprising
    means for receiving first messages from on-line users, said users including text chat session users, each said first message including a request to identify a telephone call session maintaining the anonymity of chat participants,
    means for sending a second message in response to each said first message, each said second message identifying a telephone call session,
    means for receiving third messages from on-line text chat sessions, each said message including callback information allowing the establishment of a telephone link to one of said chat participants, and
    means for sending control messages to a telephone network identifying callback information associated with at least two chat participants and authorization to complete connections between said at least two chat participants.

2. The call broker of claim 1, wherein said first and third messages originate from on-line chat clients.

3. The call broker of claim 2, wherein said second messages are sent to on-line chat client sessions and further comprise at least one Participant Authorization Code (PAC).

4. The call broker of claim 3, wherein at least some of said third messages further comprise a identification of a telephone call session.

5. The call broker of claim 3, wherein at least some of said third messages further comprise a PAC.

6. The call broker of claim 1, wherein said first messages identify all participants in a text chat session.

7. The call broker of claim 6, wherein said means for sending response messages comprises means for sending messages to an on-line chat server session.

8. A method for establishing an anonymous telephone call involving participants in an on-line text chat session comprising the steps of
    receiving a request from one of said participants to set up a telephone call connecting said one of said participants and at least one selected participant from among others of said participants,
    sending a message to said one participant, said message comprising a telephone call session identifier and at least one Participant Authorization Code (PAC),
    receiving PAC and callback information from at least one of said selected other participants, and
    sending control information to a telephone network to establish telephone links to said initiating participant and each of said selected other participants from whom said PAC and callback information was received, and to bridge said telephone links together.

9. The method of claim 8, wherein said one of said participants is an initiating participant.

10. The method of claim 8, wherein said PAC is received by said at least one of said selected other participants using instant messaging.

11. The method of claim 8, wherein said PAC is received by said at least one of said selected other participants using a private chat venue.

12. The method of claim 8, wherein said at least one of said selected other participants consists of one participant.

13. The method of claim 8, wherein said control information is sent in common channel signaling form.

14. The method of claim 9, wherein said telephone link for an initiator or selecected other participant is bridged together only if the telephone line identified by said callback information for said selected other participant is idle.

15. A method for establishing an anonymous telephone call involving participants in an on-line text chat session comprising a server chat session hosting a plurality of remote client chat sessions, said server chat session being enhanced by a Call Broker session, said method comprising the steps of
    receiving requests at said server chat session from each of a plurality of said client chat sessions to set up a telephone call connecting participants associated with each of said client chat sessions,
    sending a message to each of said participants from whom a request is received, said message comprising a telephone call session identifier and at least one Participant Authorization Code (PAC), receiving at said Call Broker session from each of a plurality of said client chat sessions said PAC and callback information for the telephone associated with respective client chat sessions, and sending control information to a telephone network to establish telephone links to said initiating participant and each of said selected other participants from whom said PAC and callback information was received, and to bridge said telephone links together.

16. The method of claim 15, wherein said plurality of participants consists of one participant.

17. The method of claim 15, wherein said control information is sent in common channel signaling form.

18. The method of claim 15, wherein said telephone link for participant is bridged together only if the telephone line identified by said callback information for said selected participant is idle.

* * * * *